(12) United States Patent
Anderson et al.

(10) Patent No.: US 7,613,532 B2
(45) Date of Patent: Nov. 3, 2009

(54) SYSTEMS AND METHODS FOR IMPROVING THE SIGNAL TO NOISE RATIO FOR AUDIO INPUT IN A COMPUTING SYSTEM

(75) Inventors: Jason M. Anderson, Snoqualmie, WA (US); Theodore C. Tanner, Hollywood, SC (US)

(73) Assignee: Microsoft Corporation, Redmond, WA (US)

( * ) Notice: Subject to any disclaimer, the term of this patent is extended or adjusted under 35 U.S.C. 154(b) by 1005 days.

(21) Appl. No.: 10/704,956

(22) Filed: Nov. 10, 2003

(65) Prior Publication Data

US 2005/0102048 A1    May 12, 2005

(51) Int. Cl.
*G06F 17/00* (2006.01)
*G10K 11/16* (2006.01)

(52) U.S. Cl. .................................... 700/94; 381/71.7

(58) Field of Classification Search ................. 700/94; 381/71.1, 71.4, 71.7, 94.7
See application file for complete search history.

(56) References Cited

U.S. PATENT DOCUMENTS

| | | | | |
|---|---|---|---|---|
| 5,058,170 | A * | 10/1991 | Kanamori et al. | 381/92 |
| 5,400,409 | A * | 3/1995 | Linhard | 381/92 |
| 5,459,702 | A * | 10/1995 | Greenspan | 369/25.01 |
| 5,754,665 | A * | 5/1998 | Hosoi | 381/94.1 |
| 5,828,768 | A * | 10/1998 | Eatwell et al. | 381/333 |
| 6,241,612 | B1 * | 6/2001 | Heredia | 463/42 |
| 6,522,753 | B1 * | 2/2003 | Matsuzawa et al. | 381/71.1 |
| 6,549,630 | B1 * | 4/2003 | Bobisuthi | 381/94.7 |
| 6,738,482 | B1 * | 5/2004 | Jaber | 381/94.7 |
| 6,928,329 | B1 * | 8/2005 | Giaimo et al. | 700/94 |
| 6,975,948 | B2 * | 12/2005 | Ramillon et al. | 702/76 |
| 7,139,401 | B2 * | 11/2006 | Culman et al. | 381/71.7 |
| 2003/0040908 | A1 * | 2/2003 | Yang et al. | 704/233 |
| 2003/0052807 | A1 * | 3/2003 | Yeh et al. | 341/144 |

(Continued)

OTHER PUBLICATIONS

Saruwatari, Hiroshi; Kajita, Shoji; Takeda, Kazuya; Itakura, Fumitada; "Speech Enhancement Based on Noise Adaptive Nonlinear Microphone Array;" *Signal Processing X Theories and Applications, Proceedings of EUSIPCO 2000, Tenth European Signal Processing Conference*, Tampere, Finland, Sep. 4-8, 2000; Tampere Univ. Technology, Tampere, Finland, 2000; vol. 1, pp. 175-178.

(Continued)

*Primary Examiner*—Curtis Kuntz
*Assistant Examiner*—Daniel R Sellers
(74) *Attorney, Agent, or Firm*—Woodcock Washburn LLP (57) ABSTRACT

Systems and methods for improving the signal to noise ratio for audio input in a computing system are provided. Signal to noise ratio improvements are enabled for an input audio signal by incorporating a plurality of microphones into the PC environment, for example, to improve the processing of voice or speech input or other audio capture applications. In various embodiments, a plurality of microphones are spaced apart, e.g., attached to or within a PC housing, in such a way that noise from PC components can be "subtracted" or reduced from an input audio signal, which increases the signal to noise ratio and improves audio processing accuracy. The "subtraction" or reduction techniques applied by the present invention are unique to the PC environment wherein different noises having particular characteristics can be identified, including, but not limited to, rattle of device components, fan noise and disk noise.

58 Claims, 7 Drawing Sheets

U.S. PATENT DOCUMENTS

2003/0177006 A1* 9/2003 Ichikawa et al. ............ 704/231
2004/0022398 A1* 2/2004 Yeh et al. ................... 381/94.1
2004/0184571 A1* 9/2004 Currivan et al. ............ 375/346

OTHER PUBLICATIONS

Saruwatari, Hiroshi; Kajita, Shoji; Takeda, Kazuya; Itakura, Fumitada; "Speech Enhancement Using Nonlinear Microphone Array With Noise Adaptive Complementary Beamforming;" *2000 IEEE International Conference on Acoustics, Speech and Signal Processing*, Istanbul, Turkey, Jun. 5-9, 2000; IEEE, Piscataway, NJ, USA, 2000; vol. 2, pp. 1049-1052.

Saruwatari, Hiroshi; Kajita, Shoji; Takeda, Kazuya; Itakura, Fumitada; "Speech Enhancement Using Nonlinear Microphone Array Based on Noise Adaptive Complementary Beamforming;" *IEICE Transactions on Fundamentals of Electronics, Communications and Computer Sciences*; Inst. Electron. Inf. & Commun. Eng., Japan, May 2000; vol. E83-A, No. 5, pp. 866-876.

Saruwatari, Hiroshi; Kajita, Shoji; Takeda, Kazuya; Itakura, Fumitada; "Speech Enhancement Using Nonlinear Microphone Array Based on Complementary Beamforming;" *IEICE Trans. Fundam. Electron. Commun. Comput. Sci,*, Nigata, Japan, Nov. 12-13, 1998; Inst. Electron. Inf. & Commun. Eng., Japan, Aug. 1999; vol. E82-A, No. 8, pp. 1501-1510.

Saruwatari, Hiroshi; Kajita, Shoji; Takeda, Kazuya; Itakura, Fumitada; "Speech Enhancement Using Nonlinear Microphone Array Based on Complementary Beamforming;" *1999 IEEE International Conference on Acoustics, Speech, and Signal Processing*, Phoenix, AZ, USA, Mar. 15-19, 1999; IEEE, Piscataway, NJ, USA, 1999; vol. 1, pp. 69-72.

Date, Hikaru; Watanabe, Tomio; "Spatially Selective Multi-Microphone System;" *Recent Research Towards Advanced Man-Machine Interface Through Spoken Language*; Elsevier Science B.V., Amsterdam, Netherlands; 1996; pp. 461-468.

Zhang, Ming; Er, M.H.; "A New Method of Tracking Talker Location for Microphone Arrays in Near Field;" *1995 IEEE ASSP Workshop on Applications of Signal Processing to Audio and Acoustics*, New Paltz, NY, USA, Oct. 15-18, 1995; , IEEE, New York, NY, USA; 1995; pp. 1-4.

Park, Young C.; Sommerfeldt, Scott D.; "A Fast Adaptive Noise Control Algorithm Based on the Lattice Structure;" *Applied Acoustics*; Elsevier Science Limited, Great Britain; 1996; vol. 47, p. 1-25.

Dunlop, J; Al-Kindi, M.J.; Virr, L.E.; "Application of Adaptive Noise Cancelling to Diver Voice Communications;" *1987 International Conference on Acoustics, Speech, and Signal Processing*, Dallas, TX, USA, Apr. 6-9, 1987; IEEE, New York, NY, USA; 1987; vol. 3, pp. 1708-1711.

* cited by examiner

Two Channel
Adaptive Noise Canceller

FIG. 3

Where:
$r(n) = s(n) + n(n)$
$N_0(n)$ = Reference noise
System estimates $s(n)$ by first estimating $\hat{n}(n)$ from $N_0(n)$
then subtracts estimate from total input

$\hat{S}(n) = S(n) + [n(n) - \hat{n}(n)]$ $H_0(m) W(m) = 1$

For perfect cancellation $N_0(m) = H_0(m) N(m)$

System Input and Noise Input are known a priori. The microphone samples the PC generated noise and then gets cancelled

FIG. 4

SYSTEMS AND METHODS FOR IMPROVING THE SIGNAL TO NOISE RATIO FOR AUDIO INPUT IN A COMPUTING SYSTEM

COPYRIGHT NOTICE AND PERMISSION

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright© 2003, Microsoft Corp.

FIELD OF THE INVENTION

The present invention is directed to systems and methods for improving the signal to noise ratio for audio input in a computing system. More particularly, the present invention is directed to systems and methods for addressing particular kinds of noise in a generally enclosed computing system environment.

BACKGROUND

Real-time communication (RTC) through the personal computer (PC) and other computing devices is fast becoming a powerful means for users to communicate with each other. Speech recognition is also important as a natural interface to the PC environment for dictation, command and control. However, today's PC is generally too noisy for effective speech recognition and real-time communication scenarios that depend on accurate processing of audio, such as voice over IP (VOIP) and PC-telephony integration. The difference between a computer using speech recognition technologies accurately resolving a sound to a single linguistic counterpart and a computer not being able to perceive the difference between multiple linguistic choices for a sound can be small in terms of the corresponding signal to noise ratios. Thus, a small increase in signal to noise ratio can make all of the difference in the world when it comes to consistently accurate resolution of sound, such as speech.

In this regard, noise from the PC and its components interferes with accurate processing of audio input signals by speech recognition technologies employing digital analysis. PC system noise raises the noise floor and concomitantly lowers the signal-to-noise ratio (SNR), which reduces the effective signal for speech recognition and other programs that process audio input.

Consumers who want to capture audio input in today's PC environment must understand enough about acoustics and microphone technology to make an informed purchase of a high-quality microphone and place it in an optimal location. For consumers who are unwilling or unable to do this, today's PC environment is typically too noisy for scenarios that depend on accurate processing of audio, such as speech recognition, VOIP and PC telephony.

Many prior techniques focused solely on the noise reduction algorithm and not the entire system and method for characterization of a particular type of noise source. For instance, from Silverberg et. al. "Feedback Method of Noise Control Having Multiple Inputs and Outputs" (U.S. Pat. No. 5,953,428), mention is made of only computational aspects whereby the feedback system computation is optimized. Furthermore, most existing solutions are aimed at complete hardware fixes that focus on literal damping of the acoustic noise to be eliminated. For reference, see e.g., http://www.quietpc.com/. A seminal work on sound absorption is Olson, H. F. and May E. G. (1953), Electronic Sound Absorber, *Journal of the Acoustical Society of America* 25, 1130-1136. Many historical aspects of vibration and control can be found in Elliot, S. J. and Nelson, P. A. "Active Control of Sound" as well.

Dolby noise reduction (NR) is an existing noise reduction technique. Dolby NR makes no attempt to remove noise once it has been mixed in with the music. Rather, it prevents noise from being added to music as it is recorded in the first place. Dolby NR utilizes a two-step process that first encodes the music when it is recorded, and then decodes it when the tape is played back. This is why the Dolby noise reduction system in one's recorder/playback system should be switched on both when a cassette is recorded and when the cassette is being played.

In recording, the Dolby NR circuit makes the quiet parts of the music, which are most susceptible to noise, louder than normal. When the encoded tape is played back, the Dolby NR circuit is switched around to lower, in turn, the previously boosted parts of the music. This automatically lowers any noise added to the music by the recording process, and it restores the music to its original form so that nothing is changed or lost but the noise.

While Dolby NR has been utilized effectively for music being recorded on a cassette, Dolby NR has never been applied to the PC environment. Moreover, while Dolby NR works quite positively for white noise having equal distribution across the spectrum of frequencies (a constant hiss, for example, that results from cassette head recording electronics), its use is not specifically optimized for the type of noise being made. Instead, the algorithms of Dolby NR are applied based upon knowledge of how the human ear tends to work, i.e., that a human ear tends to hear in a spectrally related way. The Dolby NR algorithms are thus generalized based upon characteristics of the human ear, and accordingly are not suited to optimizing the signal to noise ratio of a signal input to a PC in view of the type of noise that a PC generates.

In another signal analysis prior art area involving the analysis of noise, snapping shrimp noise is thought to be a major component of ambient noise at high frequencies (2 kHz-300 kHz) in warm shallow water. Accordingly, experiments have been designed to investigate its temporal and spatial distribution and variability, having applications to many underwater acoustic systems in providing background knowledge about the structure of this class of noise. For instance, in Li et al.'s "Estimating Snapping Shrimp Noise in Warm Shallow Water" (1999), three noise models, namely system noise, observational noise and beampattern uncertainty, are used to pattern noise. Their simulation results indicate that their stochastic inversion algorithm is robust to reasonable levels of these types of noise, enabling the imaging of shrimp noise intensity on a seabed over an area of some 350 $m^2$ with a resolution of 3.5 $m^2$ and with a Root Mean Squared (rms) error below 20%, or approximately 0.8 dB.

The analysis of snapping shrimp noise illustrates that the modeling of a particular type of noise (i.e., shrimp noise) according to known mathematical models is known in the art of noise analysis and reduction. To people in search of shrimp beds, the goal may even be to enhance shrimp noise over other ambient aquatic noises. However, the modeling of shrimp noise is hardly applicable to a PC environment for a variety of reasons (other than that computers do not behave well when the internal electronics are shorted). Mainly, the shrimp noise is not coming from within a small substantially enclosed area, the shrimp noise follows a single mathematical model and the signal of interest is not nearby and directed at the small substantially enclosed area for processing.

It is also known in the art to use beamforming. A beamformer is a spatial filter that operates on the output of an array of sensors in order to enhance the amplitude of a coherent wavefront relative to background noise and directional interference. The so-called "pointing direction"0 is called the Maximum Response Angle (MRA), and can be arbitrarily chosen for the beams. The goal of beamforming is to sum multiple elements to achieve a narrower response in a desired direction (the MRA). That way when a sound is heard in a given beam, the direction from which it came is known. Real implementations introduce things such as nulls and sidelobes, which are not discussed herein. However, beamforming also does not tailor its technique to the type of noise characteristic in a PC enclosed environment, and the enclosure itself inhibits the notion of directional interference.

Two types of noise known to affect cell phone operation are hybrid echoes and acoustic echoes. Hybrid echo(s) relate to delay(s) in the electrical path between the microphone and earpiece of speaker and receiver, respectively, and are inherent in designs involving 2-to-4 wire conversion. Acoustic echo is created by the loudspeaker in a phone. The sound comes out of loudspeaker in the phone, bounces off the walls, ceiling and other objects in the room, reflects and comes back to the phone's microphone. It is thus known in the cell phone art to use a technique called echo cancellation to minimize the effects of these communication nuisances. However, these kinds of echoes are not endemic to a PC operating environment.

In short, there is ambient noise (e.g., phone ringing, air conditioning, street noise, planes flying by, people talking, etc.) in a PC environment and there is PC noise (e.g., fans, disks, chassis rattle, etc.). There are a number of mechanisms that already exist for addressing ambient noise in a target environment, such as spatial filtering, beamforming and echo cancellation algorithms, some of which are discussed herein; none of these algorithms, however, adequately address the problem of PC noise affecting the resolution of a recording of an input audio signal due to predominance of noise in the signal to noise ratio.

Accordingly, there is a great need for a mechanism or vehicle to improve the ability of the PC to process audio input accurately, making the PC a much better tool for speech recognition and real-time communication for home and business users. Such a tool would have practical use beyond the boundaries of the PC environment as well, to the extent that such environments mimic the characteristics of the PC noise, such as in some noisy industrial environments. It would be further desirable to recognize the particular kinds of noise that exist in a PC environment, so as to apply algorithms suited to the reduction of PC noise. It would be further desirable to develop mathematical models that efficiently model the type(s) of noise identified in a PC environment, so it may be effectively reduced to improve the signal to noise ratio associated with the input of an audio signal to a PC environment. It would be still further desirable to provide such a mechanism at a low cost to the consumer.

SUMMARY OF THE INVENTION

The present invention provides systems and methods for improving the signal to noise ratio of audio input in a computing system. The invention thus enables audio signal input signal to noise ratio improvements that incorporate a plurality of microphones into the PC environment, for example, to improve the processing of voice or speech input or other audio capture applications. In various embodiments, the invention incorporates a plurality of microphones spaced apart, e.g., attached to or within a PC housing, in such a way that noise from PC components can be "subtracted" or reduced from an input audio signal, which increases the signal to noise ratio and improves audio processing accuracy. The "subtraction" or reduction techniques applied by the present invention are unique to the PC environment wherein different noises having particular characteristics can be identified, including, but not limited to, noise from rattle of the housing or other component in the PC environment, fan noise and disk noise.

Other features and embodiments of the present invention are described below.

BRIEF DESCRIPTION OF THE DRAWINGS

The systems and methods for improving the signal to noise ratio for audio input in accordance with the present invention are further described with reference to the accompanying drawings in which.

DETAILED DESCRIPTION OF THE INVENTION

Overview

As mentioned, the present invention improves the signal to noise ratio for audio input by incorporating at least two microphones into the PC computing environment. The invention incorporates a plurality of microphones into the PC in such a way that noise from PC components is "subtracted" from an input audio signal, which increases the signal to noise ratio and improves audio processing accuracy.

The benefits of the invention are clear. In addition to improving the quality of the audio signal by boosting its significance relative to PC noise, the present invention relieves consumers of the burden of managing the acoustics of the PC, i.e., the consumer does not need to choose a microphone or decide where to place it in order to enjoy the benefits of highly accurate audio input. Another notable characteristic of the invention is that it corrects noise from inside the PC, not ambient noise from the user's environment. The present invention also provides a low-cost means for users to have a better experience with voice input at the PC, using low-cost hardware and elegant algorithm(s), rather than more expensive hardware and complex algorithm(s). This invention thus greatly improves the ability of the PC to process audio input accurately, which makes it a much better tool for speech recognition and real-time communication for home and business users. The invention also has significant potential for PCs used in noisy industrial environments.

Exemplary Networked and Distributed Environments

One of ordinary skill in the art can appreciate that noise can result from any computer or other client or server device, which can be deployed as part of a computer network, or in a distributed computing environment. In this regard, the present invention pertains to any computer system or environment having any number of memory or storage units, and any number of applications and processes occurring across any number of storage units or volumes, which may be used in connection with processes for which the increase of signal to noise ratio in accordance with the present invention would be advantageous. The present invention may apply to an environment with server computers and client computers deployed in a network environment or distributed computing environment, having remote or local storage. The present invention may also be applied to standalone computing devices, having programming language functionality, interpretation and execution capabilities for generating, receiving and transmitting information in connection with remote or local services. RTC communication is particularly relevant to those computing devices operating in a network or distributed computing environment, and thus the signal to noise ratio improvement techniques in accordance with the present invention can be applied with great efficacy in those environments.

Distributed computing facilitates sharing of computer resources and services by exchange between computing devices and systems. These resources and services include the exchange of information, cache storage, and disk storage for files, all of which can implicate and create noise in a computing environment. Distributed computing takes advantage of network connectivity, allowing clients to leverage their collective power to benefit the entire enterprise. In this regard, a variety of devices may have applications, objects or resources that may implicate the signal to noise ratio improvement processes of the invention.

Figure 1A:
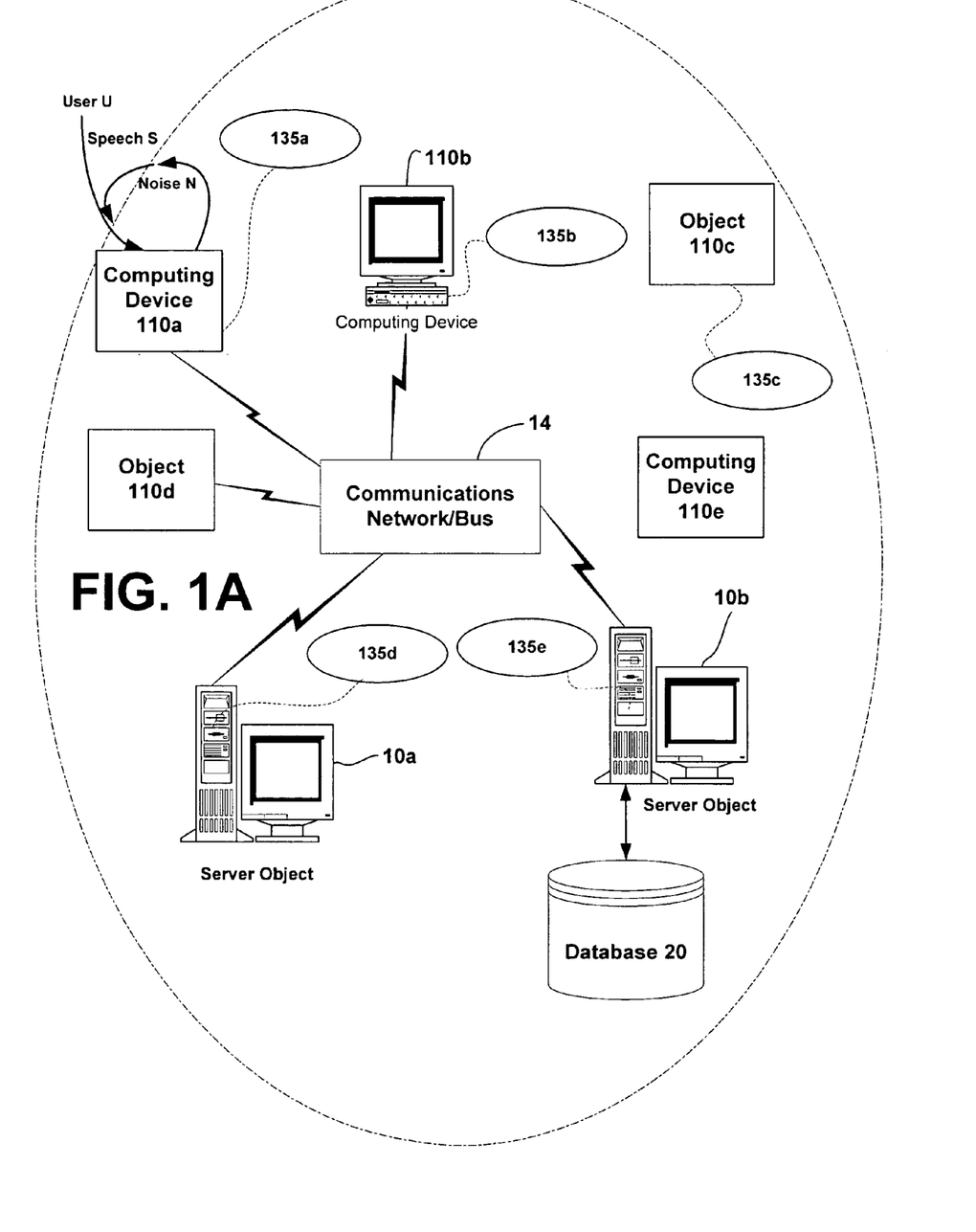
FIG. 1A is a block diagram representing an exemplary network environment having a variety of computing devices in which the present invention may be implemented.

FIG. 1A provides a schematic diagram of an exemplary networked or distributed computing environment. The distributed computing environment comprises computing objects 10a, 10b, etc. and computing objects or devices 110a, 110b, 110c, etc. These objects may comprise programs, methods, data stores, programmable logic, etc. The objects may comprise portions of the same or different devices such as PDAs, televisions, MP3 players, televisions, personal computers, etc. Each object can communicate with another object by way of the communications network 14 (e.g., RTC). This network may itself comprise other computing objects and computing devices that provide services to the system of FIG. 1A, and may itself represent multiple interconnected networks. In accordance with an aspect of the invention, each object 10a, 10b, etc. or 110a, 110b, 110c, etc. may contain an application that might make use of an API, or other object, software, firmware and/or hardware, to request use of the signal to noise ratio improvement processes in accordance with the invention.

It can also be appreciated that an object, such as 110c, may be hosted on another computing device 10a, 10b, etc. or 110a, 110b, etc. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wired or wireless systems, by local networks or widely distributed networks. Currently, many of the networks are coupled to the Internet, which provides the infrastructure for widely distributed computing and encompasses many different networks. Any of the infrastructures may be used for exemplary real-time communications (or other applications that rely on a desirable signal to noise ratio).

In home networking environments, there are at least four disparate network transport media that may each support a unique protocol, such as Power line, data (both wireless and wired), voice (e.g., telephone) and entertainment media. Most home control devices such as light switches and appliances may use power line for connectivity. Data Services may enter the home as broadband (e.g., either DSL or Cable modem) and are accessible within the home using either wireless (e.g., HomeRF or 802.11b) or wired (e.g., Home PNA, Cat 5, Ethernet, even power line) connectivity. Voice traffic may enter the home either as wired (e.g., Cat 3) or wireless (e.g., cell phones) and may be distributed within the home using Cat 3 wiring. Entertainment media, or other graphical data, may enter the home either through satellite or cable and is typically distributed in the home using coaxial cable. IEEE 1394 and DVI are also digital interconnects for clusters of media devices. All of these network environments and others that may emerge as protocol standards may be interconnected to form a network, such as an intranet, that may be connected to the outside world by way of the Internet. In short, a variety of disparate sources exist for the storage and transmission of data, and consequently, moving forward, computing devices will require ways of sharing data, such as data accessed or utilized incident to program objects, which make use of the signal to noise ratio improvement techniques in accordance with the present invention.

The Internet commonly refers to the collection of networks and gateways that utilize the TCP/IP suite of protocols, which are well-known in the art of computer networking. TCP/IP is an acronym for "Transmission Control Protocol/Internet Protocol." The Internet can be described as a system of geographically distributed remote computer networks interconnected by computers executing networking protocols that allow users to interact and share information over the network (s). Because of such wide-spread information sharing, remote networks such as the Internet have thus far generally evolved into an open system for which developers can design software applications for performing specialized operations or services, essentially without restriction.

Thus, the network infrastructure enables a host of network topologies such as client/server, peer-to-peer, or hybrid architectures. The "client" is a member of a class or group that uses the services of another class or group to which it is not related. Thus, in computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the example of FIG. 1A, computers 110a, 110b, etc. can be thought of as clients and computer 10a, 10b, etc. can be thought of as the server where server 10a, 10b, etc. maintains the data that is then replicated in the client computers 110a, 110b, etc., although any computer could be considered a client, a server, or both, depending on the circumstances. Any of these computing devices may be processing data or requesting services or tasks that may implicate the signal to noise ratio improvement techniques of the invention.

A server is typically a remote computer system accessible over a remote or local network, such as the Internet. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the signal to noise ratio improvement techniques of the invention may be distributed across multiple computing devices or objects.

Client(s) and server(s) communicate with one another utilizing the functionality provided by a protocol layer. For example, HyperText Transfer Protocol (HTTP) is a common protocol that is used in conjunction with the World Wide Web (WWW). Typically, a computer network address such as an Internet Protocol (IP) address or other reference such as a Universal Resource Locator (URL) can be used to identify the server or client computers to each other. The network address can be referred to as a URL address. Communication can be provided over a communications medium, e.g., client(s) and server(s) may be coupled to one another via TCP/IP connections for high-capacity communication.

Thus, FIG. 1A illustrates an exemplary networked or distributed environment, with a server in communication with client computers via a network/bus, in which the present invention may be employed. In more detail, a number of servers 10a, 10b, etc., are interconnected via a communications network/bus 14, which may be a LAN, WAN, intranet, the Internet, etc., with a number of client or remote computing devices 110a, 110b, 110c, 110d, 110e, etc., such as a portable computer, handheld computer, thin client, networked appliance, or other device, such as a VCR, TV, oven, light, heater and the like in accordance with the present invention. It is thus contemplated that the present invention may apply to any computing device in connection with which it is desirable to implement signal (such as speech) to noise (from the device) ratio improvement. As illustrated in FIG. 1A, one can see that the problem results from noise N originating from any computing device (illustrated as originating in device 110a), whereby an input signal (such as speech S from a user U) suffers a quality degradation as a result of the addition of noise N to the environment both inside and outside of the housing (not shown) of computing device 110a. Thus, the signal to noise ratio of the signal S relative to noise N lowers when noise N is not mitigated according to the systems and methods provided by the present invention.

In a network environment in which the communications network/bus 14 is the Internet, for example, the servers 10a, 10b, etc. can be Web servers with which the clients 110a, 110b, 110c, 110d, 110e, etc. communicate via any of a number of known protocols such as HTTP. Servers 10a, 10b, etc. may also serve as clients 110a, 110b, 110c, 110d, 110e, etc., as may be characteristic of a distributed computing environment. Communications may be wired or wireless, where appropriate. Client devices 110a, 110b, 110c, 110d, 110e, etc. may or may not communicate via communications network/bus 14, and may have independent communications associated therewith. For example, in the case of a TV or VCR, there may or may not be a networked aspect to the control thereof. Each client computer 110a, 110b, 110c, 110d, 110e, etc. and server computer 10a, 10b, etc. may be equipped with various application program modules or objects 135 and with connections or access to various types of storage elements or objects, across which files or data streams may be stored or to which portion(s) of files or data streams may be downloaded, transmitted or migrated. Any computer 10a, 10b, 110a, 110b, etc. may be responsible for the maintenance and updating of a database 20 or other storage element, such as a database or memory 20 for storing data processed according to the invention. Thus, the present invention can be utilized in a computer network environment having client computers 110a, 110b, etc. that can access and interact with a computer network/bus 14 and server computers 10a, 10b, etc. that may interact with client computers 110a, 110b, et. and other like devices, and databases 20.

Exemplary Computing Device

Figure 1B:
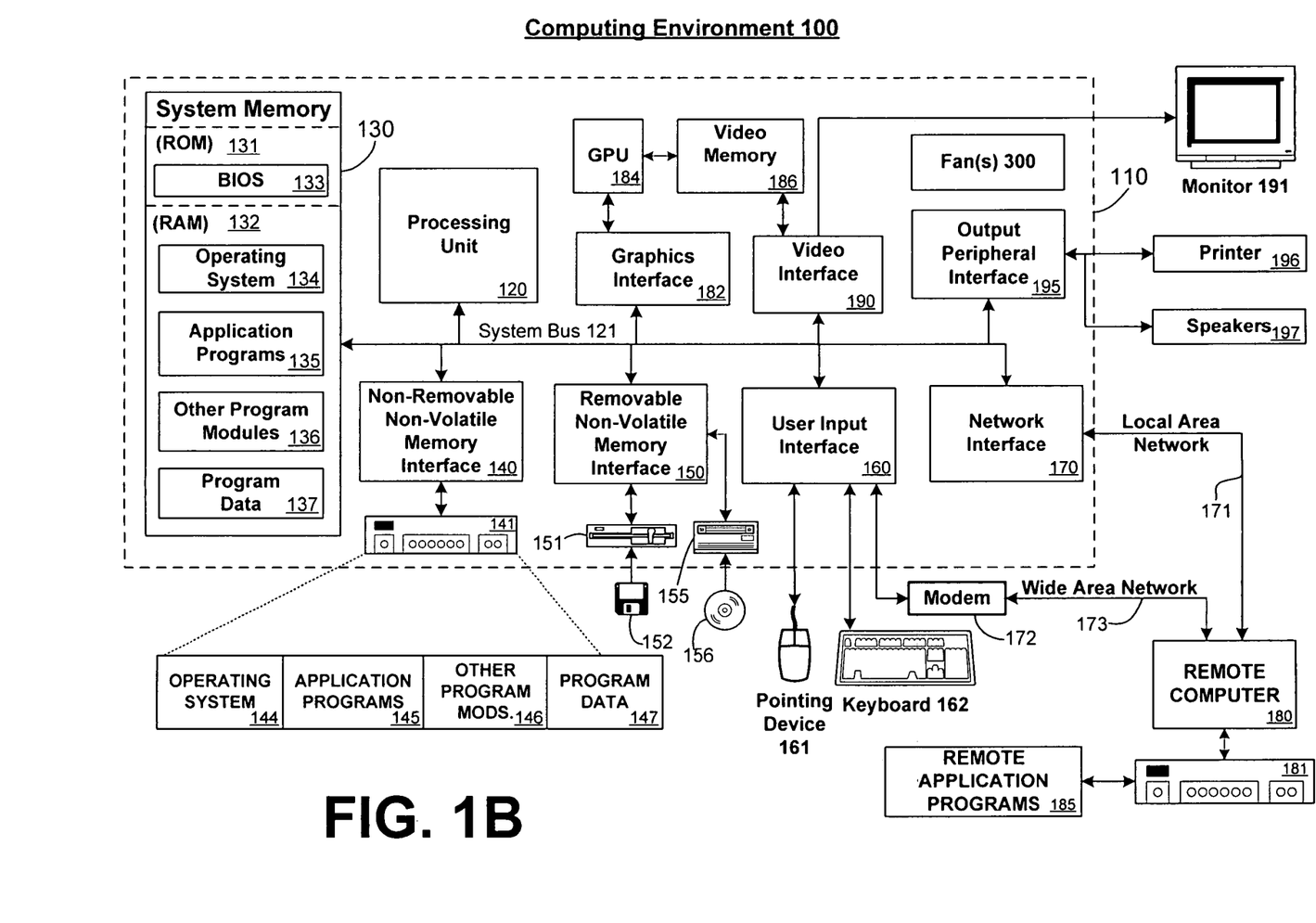
FIG. 1B is a block diagram representing an exemplary non-limiting computing device in which the present invention may be implemented.

FIG. 1B and the following discussion are intended to provide a brief general description of a suitable computing environment in connection with which the invention may be implemented. It should be understood, however, that handheld, portable and other computing devices and computing objects of all kinds are contemplated for use in connection with the present invention, i.e., anywhere where noise is generated in a computing environment. While a general purpose computer is described below, this is but one example, and the present invention may be implemented with a thin client having network/bus interoperability and interaction. Thus, the present invention may be implemented in an environment of networked hosted services in which very little or minimal client resources are implicated, e.g., a networked environment in which the client device serves merely as an interface to the network /bus, such as an object placed in an appliance. In essence, anywhere that data may be stored or from which data may be retrieved or transmitted to another computer is a desirable, or suitable, environment for operation of the techniques for signal to noise ratio improvement in accordance with the invention.

Although not required, the invention can be implemented via an operating system, for use by a developer of services for a device or object, and/or included within application software that operates in connection with signal to noise ratio improvement in accordance with the invention. Software may be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations and protocols. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, appliances, lights, environmental control elements, minicomputers, mainframe computers and the like. The invention may also be practiced in distributed computing environments where tasks are performed by remote processing devices that are linked through a communications network/bus or other data transmission medium. In a distributed computing environment, program modules may be located in both local and remote computer storage media including memory storage devices, and client nodes may in turn behave as server nodes.

FIG. 1B thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 1B, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. One or more fans 300 may be present as a way to cool components of computer 110, such as the power supply, which may contribute to noise generated in the system. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1B illustrates operating system 134, application programs 135, other program modules 136, and program data 137.

The computer 110 may also include other removable/non-removable, volatile/nonvolatile computer storage media. By way of example only, FIG. 1B illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1B provide storage of computer readable instructions, data structures, program modules and other data for the computer 110. In FIG. 1B, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A graphics interface 182, such as Northbridge, may also be connected to the system bus 121. Northbridge is a chipset that communicates with the CPU, or host processing unit 120, and assumes responsibility for accelerated graphics port (AGP) communications. One or more graphics processing units (GPUs) 184 may communicate with graphics interface 182. In this regard, GPUs 184 generally include on-chip memory storage, such as register storage and GPUs 184 communicate with a video memory 186, wherein the application variables of the invention may have impact. GPUs 184, however, are but one example of a coprocessor and thus a variety of coprocessing devices may be included in computer 110, and may include a variety of procedural shaders, such as pixel and vertex shaders. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked or distributed environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1B. The logical connections depicted in FIG. 1B include a local area network (LAN) 171 and a wide area network (WAN)

173, but may also include other networks/buses. Such networking environments are commonplace in homes, offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1B illustrates remote application programs 185 as residing on memory device 181. It will be appreciated that the network connections shown are exemplary and other means of establishing a communications link between the computers may be used.

Exemplary Distributed Computing Frameworks or Architectures

Various distributed computing frameworks have been and are being developed in light of the convergence of personal computing and the Internet. Individuals and business users alike are provided with a seamlessly interoperable and Web-enabled interface for applications and computing devices, making computing activities increasingly Web browser or network-oriented.

For example, MICROSOFT®'s managed code platform, i.e., NET, includes servers, building-block services, such as Web-based data storage and downloadable device software. Generally speaking, the .NET platform provides (1) the ability to make the entire range of computing devices work together and to have user information automatically updated and synchronized on all of them, (2) increased interactive capability for Web sites, enabled by greater use of XML rather than HTML, (3) online services that feature customized access and delivery of products and services to the user from a central starting point for the management of various applications, such as e-mail, for example, or software, such as Office .NET, (4) centralized data storage, which will increase efficiency and ease of access to information, as well as synchronization of information among users and devices, (5) the ability to integrate various communications media, such as e-mail, faxes, and telephones, (6) for developers, the ability to create reusable modules, thereby increasing productivity and reducing the number of programming errors and (7) many other cross-platform integration features as well.

While some exemplary embodiments herein are described in connection with software residing on a computing device, one or more portions of the invention may also be implemented via an operating system, application programming interface (API) or a "middle man" object, a control object, hardware, firmware, intermediate language instructions or objects, etc., such that the methods may be included in, supported in or accessed via all of the languages and services enabled by managed code such as .NET code, and in other distributed computing frameworks as well.

Systems and Methods for Improving the Signal to Noise Ratio for Audio Input

In one embodiment, one microphone is external and the other is inside the PC case. Both microphones capture audio input, but the internal microphone captures a stronger signal of the noise generated by PC components. The internal and external signals are then compared by software and the common frequencies are amplified. This effectively "subtracts" the PC-generated noise from the signal, which improves the signal to noise ratio.

In further embodiments, the invention employs more than two microphones. In one embodiment, for example, a single microphone could be combined with an array microphone and still cancel noise from inside the PC case.

Figure 2A:
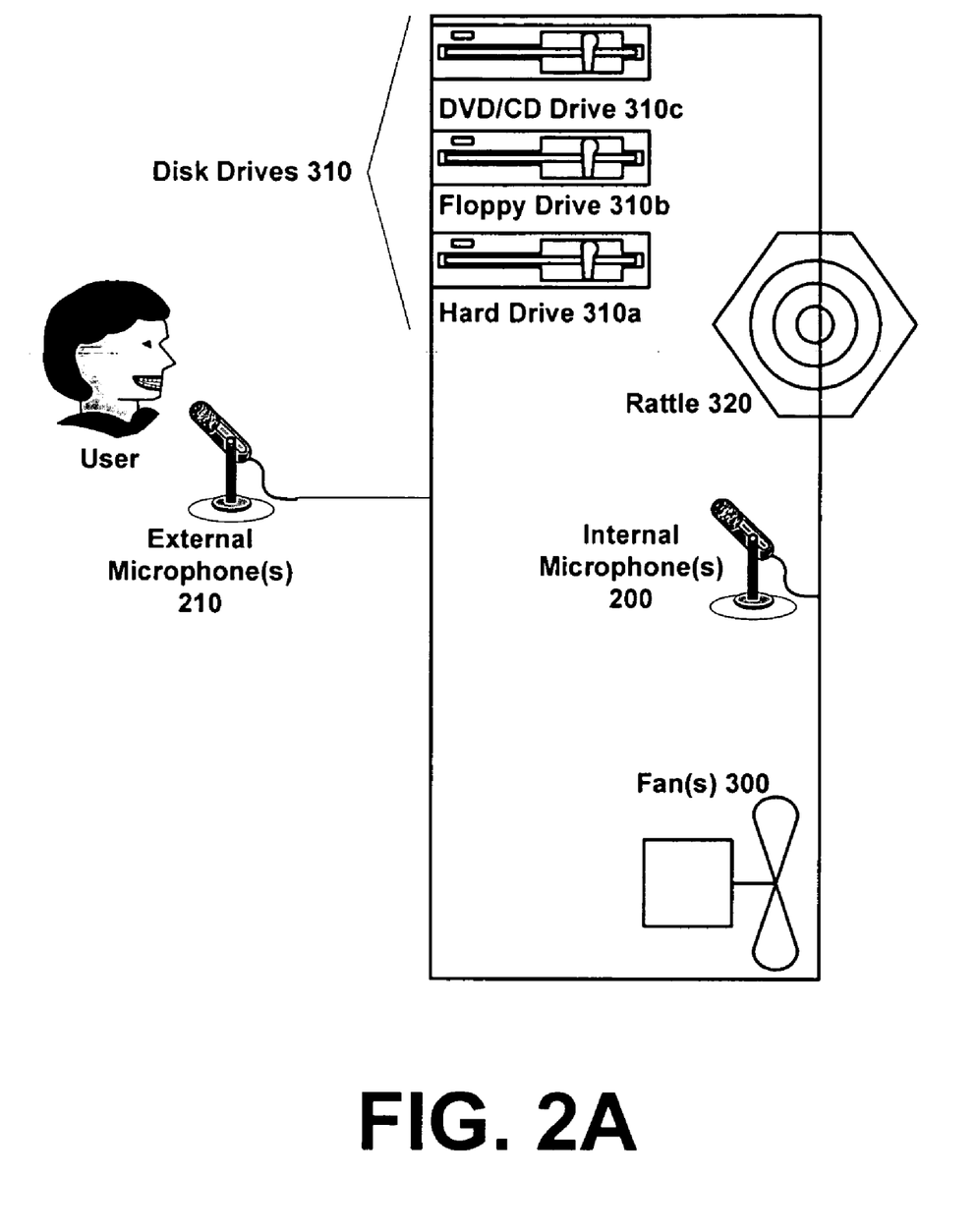
FIGS. 2A to 2C illustrate block diagrams of exemplary embodiments of the invention.

FIG. 2A illustrates a block diagram of exemplary embodiments of the invention. Three exemplary noise generators in the typical computing device are: fan(s) 300, disk drives 310, such as hard drive 310a, floppy drive 310b and DVD/CD drive 310c and rattle 320. Each of these kinds of noise has its own particular characteristics that can be exploited when filtering. For instance, fan noise tends to be somewhat periodic as the blades turn continuously, except that fans turn off and on according to temperature and power in a computing device, while generally kept at a constant voltage, fluctuates to some degree. Disk drive noise, on the other hand, is aperiodic and non-stationary, i.e., disk drives are used unpredictably. For instance, when the actual recording heads require movement in an optical drive, or when a read or write function causes a drive to spin and/or an actuator/head to move depends largely on the user that is operating the device, and when and how frequently the user initiates such operations. Rattle occurs when a monitor is turned on, or when a device is connected to the PC, or when a significant power change occurs, in essence, creating a mechanical disturbance or vibration in the housing or other component of the computing device. Since these noises occur in a confined space, e.g., the housing of a PC, reflections of these noises are also readily observable, a phenomena without as much significance in a larger room. Ambient (external) noise is also generally shielded by the housing. In this regard, the invention identifies fan noise, disk drive noise and rattling to be the three primary contributors to noise in the environment of a computing device.

In addition to the reasons presented in the background section above, the invention distinguishes over the case of canceling noise in a concert hall or a small room because those scenarios are not concerned with canceling reflection. Moreover, the present invention is concerned with different noise characteristics. For instance, the rattle of the housing of a computing device implicates noise known as Brownian noise having a characteristic Brownian noise state. Noise emission from equipment, such as information technology (IT) equipment is steadily growing. One of the major sources of IT equipment noise is the cooling fan. However, reducing the fan noise by conventional passive control means alone is generally difficult in an application due to tight volume and airflow constraints. Active noise control (ANC) can provide an enhanced noise reduction effect especially in the low frequency range where passive control methods may not be effective. To date, many researchers have reported the active reduction of tonal BPF (Blade Passing Frequency) noise from a fan. Since the broadband noise can be dominant when a fan is installed into a medium to high impedance PC casing, an ability to reduce both broadband and tonal noise is desirable.

The fundamental aspects of such a system are threefold: (1) estimate the noise, (2) cancel the noise, and (3) render an appropriate audio signal without unwanted signals. The estimation and classification along with the cancellation is of great import in this context. In accordance with the invention, the system is specifically aimed at cancellation of the characteristic noise within the IT or PC environment. The methodology used with the invention concentrates on the method of cancellation and the method of system implementation.

In various embodiments, the invention thus places at least one microphone 200 inside the housing of the device and at least one microphone 210 outside the housing of the device. By interconnecting the outputs of the microphone, summing and filtering, when the user delivers speech, the noise from components of the computing device can be "subtracted" or "inverted" or "cancelled" from the audio signal, which increases the signal to noise ratio and improves audio processing accuracy.

The cancellation usually takes the form of a Least Squares mathematical cancellation once the noise is estimated. The Least Mean Squares (LMS) form of signal conditioning was made famous by Widrow et. al. In the case of updating the coefficients of the filters, the invention takes advantage of the perceptual auditory system whereby masking effects can be obtained up to 100 milliseconds. The basic LMS algorithm includes (a) a stochastic gradient algorithm in that the gradient vector is 'random' in contrast to steepest descent, (b) on average improvements in accuracy for increasing values of n, and (c) Reduction of storage requirement to information present in its current set of weights, and operation in a non-stationary environment.

The last point is extremely valuable as the characterization of the system noise in this case is usually non-stationary. It is noted that all random processes are composed of random variables, each at its own unique point in time. Because of this, random processes have all the properties of random variables, such as mean, correlation, variances, etc. When dealing with groups of signals or sequences, the invention considers whether or not these statistical properties hold true for the entire random process. To do this, the concept of stationary processes has been developed. A stationary process may be defined as a random process where all of its statistical properties do not vary with time.

Processes whose statistical properties do change are referred to as non-stationary.

In past texts, such as Widrow et al., the LMS includes time domain implementations of the Least Mean Squared filtering response. With various embodiments of the invention, however, the system responds in the frequency domain. Thus, where the time aspect has been embodied in the past, the invention will substitute frequency components. These classes of filtering components can be considered Fast Transform Vector Filters. These classes of filters are extremely applicable to the new classes of digital signal processors and microprocessors that are readily available. However, it is noted that none of these existing classes of filters can be converted back to FFT scalar filters, which can be back converted into analog filtering processes. For an in depth review of these filtering processes see Lindquist, "Adaptive and Digital Signal Processing".

Figure 3:
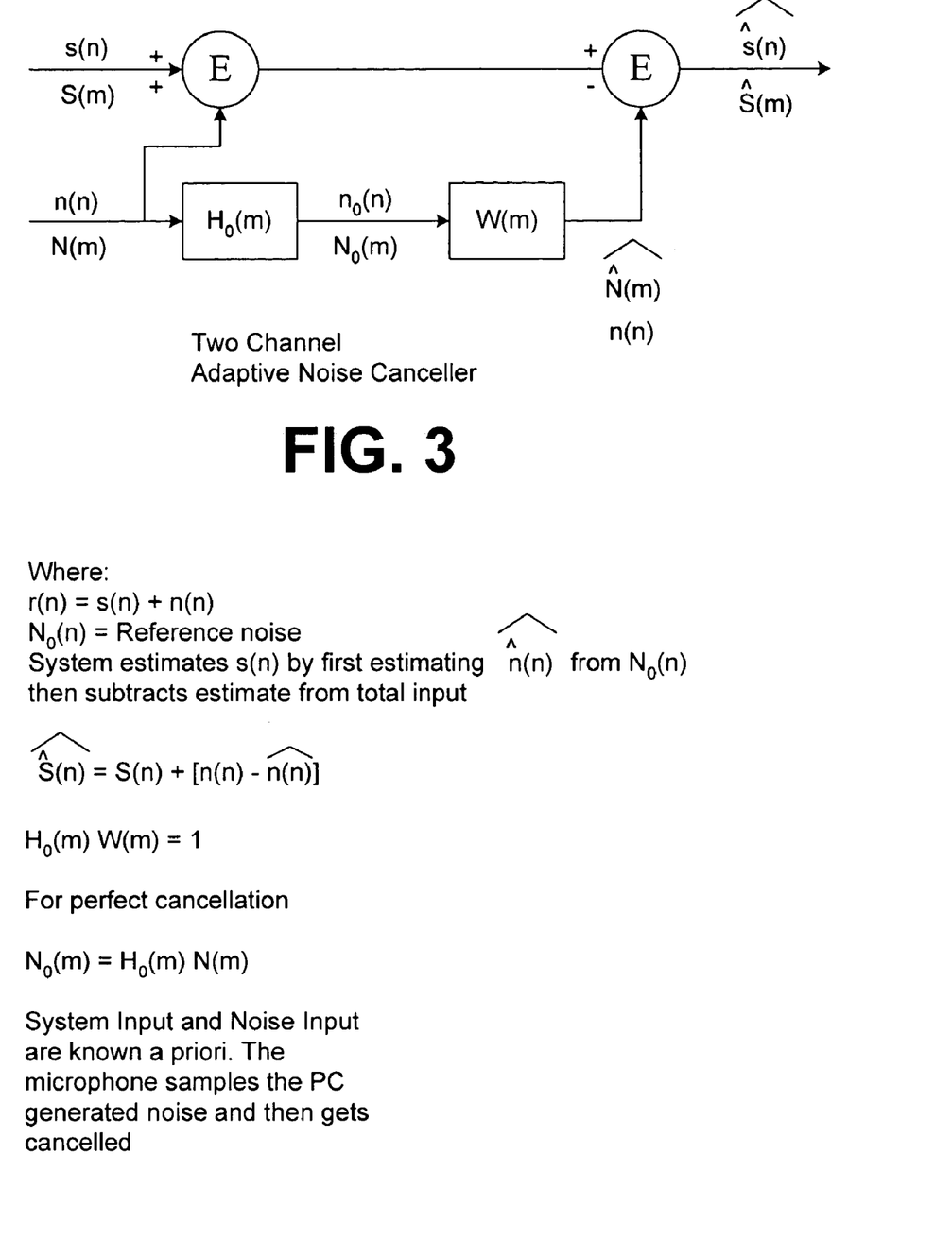
FIG. 3 is a block diagram illustrating exemplary filter characteristics and corresponding mathematics for filtering noise in accordance with the invention.
Figure 4:
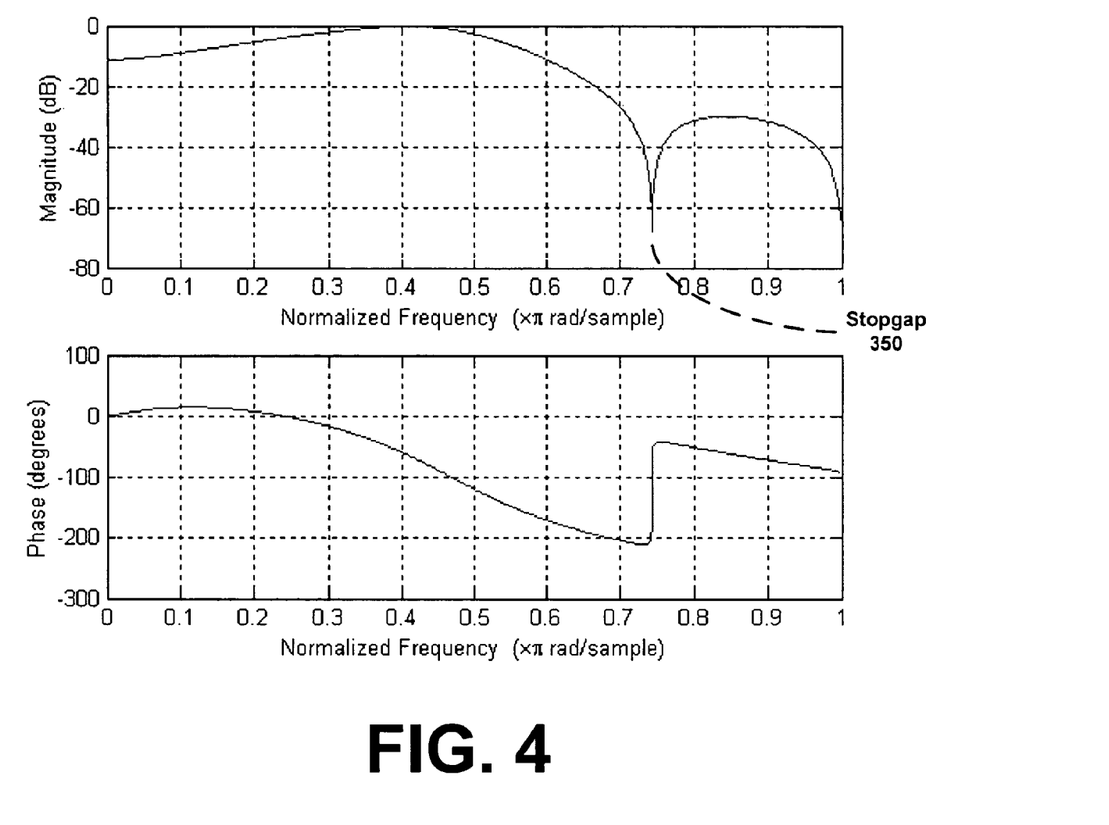
FIG. 4 illustrates exemplary results of post-filter sound input from FIG. 2B.

In embodiments of the invention, Frequency domain filtering is considered as it pertains to feedforward systems since the noise can be sampled with the microphone that is embedded in the PC. However, a feedback system can be included to seek the optimum response depending on the characteristics of any non-stationary signals. A block diagram and corresponding mathematics of an embodiment of the system of the invention is illustrated in FIG. 3, describing an FFT based adaptive feedforward system. FFT filters take two general forms either feedback or feedforward. Feedforward systems have the attribute of being stable and causal due to having no poles or singularities in the system. FFT filters designed in the frequency domain operate on the spectral properties of the system. The basic property is thus:

$$c(n) = FFT^{-1}[C(m)] = FFT^{-1}[H(m)R(m)]$$

The total input r(n) is converted into to input spectrum R(m) by the FFT block. This spectrum is in conjunction with a priori information about the signal spectrum S(m) and the noise spectrum N(m) and processed to form an equivalent transfer function H(m). Then, the input spectrum R(m) is multiplied by H(m) to form the output spectrum C(m). Thus it is noted that multiplication in the frequency domain is the same as convolution in the time domain. As mentioned earlier, a feedback mechanism can be provided in the system that would update H(m) to compensate and optimize the system output response with respect to the noise spectrum N(m). In the case of adaptive noise cancellation, it may be assumed for illustrative purposes that noise in the case of a PC or IT environment is substantially "white noise". Thus:

$$H_{ANC} = E\{|N(m)|^2\}/E\{|S(m)|^2\} + E\{|N(m)|^2\}$$

The system definition is thus considered to be of the following:

The general ANC system has two inputs. One input is the total input r(n) and composed of signals s(n) and n(n). The other input is the reference noise $n_o(n)$ which is the reference noise, e.g., the microphone placed within the cavity of the PC. This system eliminates the signal s(n) by first estimating the noise n(n) "hat" from the reference noise $n_o(n)$. It then subtracts it from the total input r(n)=s(n)+n(n) to form s(n) "hat"=s(n)+[n(n)−n(n) "hat". "Hat," normally a ^ symbol above the equation or variable, refers to an estimate. To be effective, the reference noise is correlated with the input noise and uncorrelated with the desired signal. With the invention, this is the case. With the invention, the more the noise is uncorrelated, the better the signal estimate.

Figure 2B:
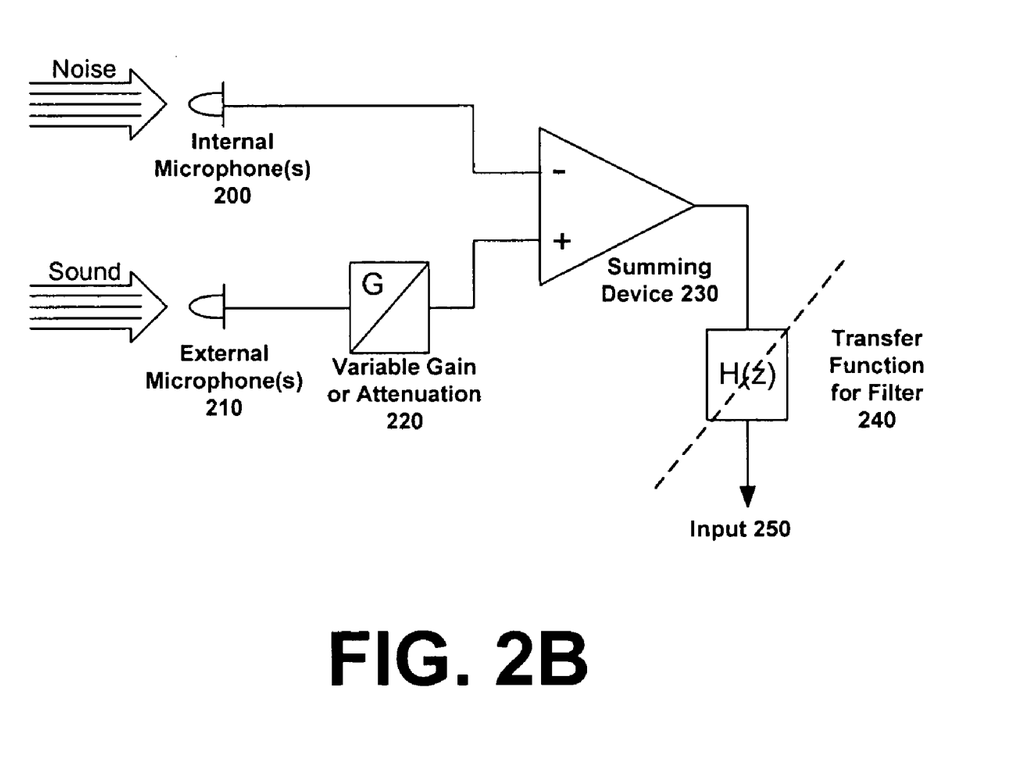

FIG. 2B shows a schematic diagram of a first embodiment of the invention. Exemplary hardware includes an internal microphone 200, i.e., located inside the housing of a computing device (not shown) and an external microphone 210, i.e., located outside the housing. The internal microphone 200 captures noise inside the housing from system components; the external microphone 210 captures sound from the user, plus a fainter signal of the noise from the PC. The external signal is strengthened through a variable gain or attenuation component 220. Both the internal and external signals are then combined in a summing device or component 230 and the combined signal is sent through a transfer function for the filter 240, labeled H(z). The result is input audio signal 250 with an improved signal to noise ratio relative to the signal picked up by external microphone 210 alone.

Not shown is that input signal 250 output from filter 240 is routed to an I/O controller, which forwards the signal to a sound card or other sound processing, recording or transmission device. In the case of the sound card, the sound card is "unaware" that the signal has been adjusted, i.e., the card simply receives a cleaner signal with a higher signal to noise ratio to pass along for software to use. Accordingly, there is no additional work for a consumer to perform; hence, the elegance of the first embodiment. FIG. 3 illustrates exemplary results of post-filter sound input 250 from FIG. 2B. One can appreciate that the frequency of the stopband rejection 350 can in essence be made to "slide back and forth" on the frequency axis, as well as its "width" to achieve desired noise subtraction results.

Figure 2C:
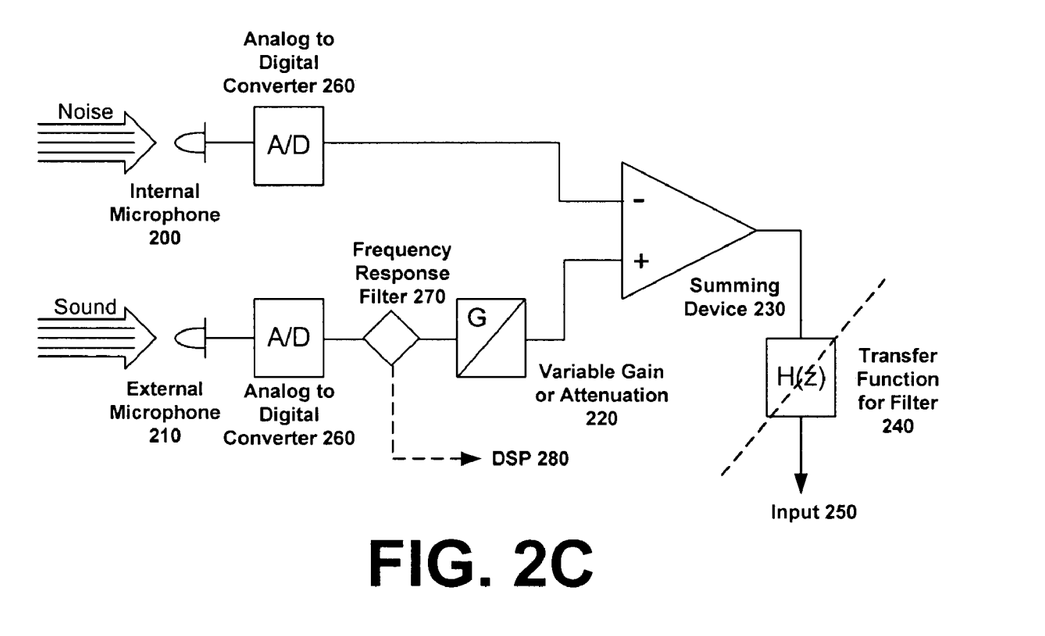

FIG. 2C shows a schematic diagram of a second embodiment of the invention. The implementation of the second embodiment uses both hardware and software. In this implementation, both input signals are routed through analog-to-digital converters. A frequency response filter intercepts the signal captured by the external microphone and routes the signal to a digital signal processing (DSP) device 280. This implementation would permit all subsequent processing (variable gain/attenuation 220, summing 230, and transfer function for filter 240) to be done by software (the device driver). FIG. 2C also illustrates the use of a frequency response filter 270 that could be used to characterize a particular microphone to capture a better quality signal.

A revised encoder/decoder may be provided to accommodate for the encoding and decoding of a signal processed according to the present invention.

Proximity of the user to the microphone may also affect an audio input signal. For example, if the user leans toward the microphone, the wavelength of audio input changes. Thus, in further embodiments, the invention incorporates a filter that dynamically changes to adjust to the proximity of the user to the microphone.

Moreover, computing device noise changes over the life of the device due to wear and tear. For example, as fan bearings wear out, the sound of the fan changes. In consideration of this fact, the invention contemplates the use of an adaptive filter, which adjusts for changes in computing device noise over the life of the computing device to maintain optimum voice input. A non-adaptive filter can correct for noise as established at time of manufacture of a computing device, but would not adapt as the noise characteristics of the device changed over time. In a further embodiment, a pre-determined set of hardware and other physical components, such as the type of housing, of a computing device can be assigned a noise globally unique identifier (GUID) based upon the noise profile of the pre-determined set such that filtering for a device can take place based upon the noise profile associated with the noise GUID of the device. This can be combined the adaptive filtering as well, by providing a good "starting point" for the adaptive filter.

The invention can be applied to enumerable sound input applications, from speech to text applications, VOIP applications, RTC applications, humming music to search for similar music, speech activated applications, and any other products and services that depend on accurate processing of audio input.

There are multiple ways of implementing the present invention, e.g., an appropriate API, tool kit, driver code, operating system, control, standalone or downloadable software object, etc. which enables applications and services to use the signal to noise ratio improvement methods of the invention. The invention contemplates the use of the invention from the standpoint of an API (or other software object), as well as from a software or hardware object that generates a signal that would benefit from the signal to noise ratio improvements techniques of the invention. Thus, various implementations of the invention described herein may have aspects that are wholly in hardware, partly in hardware and partly in software, as well as in software.

As mentioned above, while exemplary embodiments of the present invention have been described in connection with various computing devices and network architectures, the underlying concepts may be applied to any computing device or system in which it is desirable to reduce the signal to noise ratio with respect to a signal. Thus, techniques for encoding/decoding data in accordance with the present invention may be applied to a variety of applications and devices. For instance, the algorithm(s) and hardware implementations of the invention may be applied to the operating system of a computing device, provided as a separate object on the device, as part of another object, as a reusable control, as a downloadable object from a server, as a "middle man" between a device or object and the network, as a distributed object, as hardware, in memory, a combination of any of the foregoing, etc. While exemplary programming languages, names and examples are chosen herein as representative of various choices, these languages, names and examples are not intended to be limiting. One of ordinary skill in the art will appreciate that there are numerous ways of providing object code and nomenclature that achieves the same, similar or equivalent functionality achieved by the various embodiments of the invention.

As utilized herein, the term "PC noise" refers to noise characteristic(s) of a PC environment, but as was made abundantly clear throughout the description, the invention applies to any computing device having noise characteristic(s) that tend to interfere with the input of an audio signal, or to any environment having similar characteristics, i.e., a relatively small enclosed space for receiving and processing an input audio signal wherein noise associated with the space interferes with the accuracy or resolution of the recorded signal due to predominance of the noise characteristic(s).

As mentioned, the various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may implement or utilize the signal to noise ratio improvement techniques of the present invention, e.g., through the use of a data processing API, reusable controls, or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, or a receiving machine having the signal processing capabilities as described in exemplary embodiments above becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

While the present invention has been described in connection with the preferred embodiments of the various figures, it is to be understood that other similar embodiments may be used or modifications and additions may be made to the described embodiment for performing the same function of the present invention without deviating therefrom. For example, while exemplary network environments of the invention are described in the context of a networked environment, such as a peer to peer networked environment, one skilled in the art will recognize that the present invention is not limited thereto, and that the methods, as described in the present application may apply to any computing device or environment, such as a gaming console, handheld computer, portable computer, etc., whether wired or wireless, and may be applied to any number of such computing devices connected via a communications network, and interacting across the network. Furthermore, it should be emphasized that a variety of computer platforms, including handheld device operating systems and other application specific operating systems are contemplated, especially as the number of wireless networked devices continues to proliferate. Still further, the present invention may be implemented in or across a plurality of processing chips or devices, and storage may similarly be effected across a plurality of devices. Therefore, the present invention should not be limited to any single embodiment, but rather should be construed in breadth and scope in accordance with the appended claims.

What is claimed:

1. A method for improving the signal to noise ratio for an audio input signal relative to the noise characteristics of an operating computing device recording the audio input signal, comprising:
    receiving by the computing device the audio input signal;
    recording a first sound signal based on the audio input signal with at least one audio input recording device located outside a substantially enclosed housing of the computing device;
    recording a second sound signal based on the audio input signal with at least one audio input recording device located inside the substantially enclosed housing of the computing device;
    loading a noise profile stored in the computing device, the noise profile indicative of noise characteristics of the computing device as established at the time of manufacturer of the computing device;
    generating an estimated noise signal from the noise profile and the second sound signal; and
    processing the estimated noise signal and the first sound signal to remove the estimated noise signal thereby generating a third sound signal, wherein the signal to noise ratio associated with the third sound signal is higher than the signal to noise ratio of the computing device associated with the first sound signal.

2. A method according to claim 1, wherein the signal to noise ratio associated with the third sound signal is higher than the signal to noise ratio of the computing device associated with the second sound signal.

3. A method according to claim 1, wherein said processing includes processing the first and the estimated noise sound signals to deemphasize at least one of (a) noise from rattle of at least one component in the substantially enclosed housing, (b) fan noise and (c) disk noise.

4. A method according to claim 3, wherein said processing includes processing the first and the estimated noise sound signals to deemphasize disk noise includes deemphasizing noise from at least one of a floppy disk drive, a hard disk and an optical drive.

5. A method according to claim 3, wherein said processing includes processing the first and the estimated noise sound signals to deemphasize disk noise having a periodic and non-stationary noise characteristics.

6. A method according to claim 3, wherein said processing includes processing the first and the estimated noise sound signals to deemphasize fan noise having a noise characteristic that is substantially periodic, and slightly variable.

7. A method according to claim 3, wherein said processing includes processing the first and the estimated noise sound signals to deemphasize noise from rattle including a mechanical disturbance in the housing having a Brownian noise characteristic.

8. A method according to claim 3, wherein said processing includes processing the first and the estimated noise sound signals to deemphasize reflections of at least one of (a) noise from rattle of at least one component in the substantially enclosed housing, (b) fan noise and (c) disk noise.

9. A method according to claim 1, wherein said first and second the estimated noise sound signal are any of analog and digital signals.

10. A method according to claim 1, wherein the processing includes applying variable gain or attenuation to at least one of said first and the estimated noise sound signals.

11. A method according to claim 1, wherein the processing includes one of summing (a) the first and the estimated noise sound signals, (b) the estimated noise sound signal and the output of a variable gain/attenuation component that receives the first sound signal, (c) the first sound signal and the output of a variable gain/attenuation component that receives the estimated noise sound signal and (d) the output of a variable gain/attenuation component that receives the first sound signal and the output of a variable gain/attenuation component that receives the estimated noise sound signal.

12. A method according to claim 1, wherein the processing includes summing the estimated noise sound signal and the output of a variable gain/attenuation component that receives the first sound signal.

13. A method according to claim 1, wherein the processing further includes applying a filter to an intermediate signal based on said first and the estimated noise sound signals, wherein the filter is based upon the noise characteristics of the operating computing device.

14. A method according to claim 12, wherein said applying of the filter includes applying a filter with a stopband rejection characteristic, wherein the frequency range of the stopband rejection can be increased or decreased and the spread of the range from low frequency to high frequency can be changed based on the noise characteristics of the operating computing device.

15. A method according to claim 1, wherein said recording a first sound signal includes recording a first analog sound signal and wherein said recording a second sound signal includes recording a second analog sound signal, the method further comprising:
    routing the first and second analog sound signals through at least one analog-to-digital converter to generate first and second digital sound signals, respectively.

16. A method according to claim 15, further including:
    intercepting the first digital sound signal by a frequency response filter and routing the output of the frequency response filter to a digital signal processing (DSP) device.

17. A method according to claim 16, wherein said processing includes processing the output of the frequency response filter and the estimated noise digital sound signal with computer-executable instructions stored on a computer-executable medium in the operating computing device.

18. A method according to claim 17, wherein said processing includes applying variable gain/attenuation, summing and a transfer function to at least one signal based on the output of the frequency response filter and the estimated noise digital sound signal.

19. A method according to claim 1, further including outputting the third sound signal to a component of the computing device utilized in connection with at least one of a speech recognition application, a speech activated application, a real-time communication (RTC) application, a speech to text application, a voice over internet protocol (VOIP) application, a music recognition application.

20. A method according to claim 1, further including outputting the third sound signal to an I/O controller, which forwards the third sound signal to a sound card.

21. A method according to claim 1, further including encoding the third sound signal according to a pre-set encoding/decoding algorithm.

22. A method according to claim 21, further including decoding the third sound signal according to the pre-set encoding/decoding algorithm.

23. A method according to claim 1, wherein said recording the second sound signal based on the audio input signal with at least one audio input recording device located inside the substantially enclosed housing of the computing device includes recording the second sound signal with a plurality of microphones spaced apart inside the substantially enclosed housing.

24. A method according to claim 1, wherein the noise characteristics of the operating computing device substantially originate from inside the substantially enclosed housing of the operating computing device, with ambient noise generally being shielded by the housing.

25. A method according to claim 1, wherein the processing includes comparing the first sound signal and the second sound signal and amplifying the common frequencies.

26. A method according to claim 1, wherein the recording the first sound signal based on the audio input signal with at least one audio input recording device located outside a substantially enclosed housing of the computing device includes recording the first sound signal with at least one microphone and at least one array microphone.

27. A method according to claim 1, wherein at least one of (A) the recording the first sound signal based on the audio input signal with at least one audio input recording device and (B) the recording the second sound signal based on the audio input signal with at least one audio input recording device includes characterizing the at least one audio input recording device in advance with a frequency response filter for improved recording.

28. A method according to claim 1, wherein said processing includes dynamically adjusting the processing according to a filter that adjusts to the proximity of the user to the at least one recording device of the recording of the first sound signal.

29. A method according to claim 1, wherein said processing includes filtering to adjust for changes in the noise characteristics of the computing device over time to maintain optimum recording.

30. A method according to claim 1, wherein said processing includes processing in the frequency domain.

31. A computing device, including:
a plurality of physical components including a substantially enclosed housing;
at least one audio input recording device located outside the substantially enclosed housing for recording an audio signal from outside the substantially enclosed housing during a time period and generating a first sound signal based thereon;
at least one audio input recording device located inside the substantially enclosed housing for recording the audio signal from inside the substantially enclosed housing during the time period and generating a second sound signal based thereon, wherein for the first sound signal, the ratio of the audio signal to a noise signal arising from noise characteristics of at least one physical component of the plurality of physical components is greater than the ratio of the audio signal to the noise signal for the second sound signal; and
at least one signal processing component configured to load a noise profile stored in the computing device, the noise profile indicative of noise characteristics of the computing device as established at the time of manufacturer of the computing device, the signal processing component further configured to generate an estimated noise signal from the noise profile and the second sound signal and the computing device configured to process the estimated noise signal and the first sound signal to remove the estimated noise signal thereby generating a third sound signal representative of the audio signal, wherein ratio of the audio signal to noise signal associated with the third sound signal is higher than the ratios for both the first and second sound signals.

32. A computing device according to claim 31, wherein said at least one signal processing component is configured to remove at least one of (a) noise from rattle of at least one component in the substantially enclosed housing, (b) fan noise and (c) disk noise.

33. A computing device according to claim 32, wherein said at least one signal processing component is configured to remove reflections of the at least one of (a) noise from rattle of at least one component in the substantially enclosed housing, (b) fan noise and (c) disk noise.

34. A computing device according to claim 31, wherein the at least one signal processing component includes a variable gain or attenuation component that receives as input at least one of said first and second sound signals.

35. A computing device according to claim 31, wherein the at least one signal processing component includes a summing component that receives as input the second sound signal and the output of a variable gain/attenuation component that receives the first sound signal.

36. A computing device according to claim 31, wherein the at least one signal processing component includes a filter component for filtering based upon the noise characteristics of the noise signal.

37. A computing device according to claim 31, wherein the at least one signal processing component includes at least one analog-to-digital converter to generate first and second digital sound signals from said first and second sound signals, respectively.

38. A computing device according to claim 37, wherein the at least one signal processing component includes a frequency response filter which receives the first sound signal.

39. A computing device according to claim 38, wherein the at least one signal processing component includes computer-executable instructions stored on a computer-executable medium in the operating computing device for applying variable gain/attenuation, summing and a transfer function to at least one signal based on the output of the frequency response filter and the second digital sound signal.

40. A computing device according to claim 31, further including a sound card that receives the third sound signal as input.

41. A computing device according to claim 31, wherein the at least one signal processing component includes an encoder/decoder (codec) component.

42. A computing device according to claim 31, wherein the at least one signal processing component compares the first sound signal and the estimated noise signal and amplifies the common frequencies.

43. A computing device according to claim 31, wherein the at least one signal processing component includes a dynamic filter that adjusts to the proximity of the user to the at least one recording device of the recording of the first sound signal.

44. A computing device according to claim 31, wherein the at least one signal processing component includes a filter component that adjusts for changes in the noise signal of the computing device over time to maintain optimum recording.

45. A computing device according to claim 31, wherein the at least one signal processing component includes a filter that filters according to a noise globally unique identifier (GUID) assigned to the plurality of components of the computing device.

46. A computing device according to claim 31, wherein said at least one signal processing component processes the first and second sound signals in the frequency domain.

47. Signal processing electronics for processing sound signals in a computing device containing a plurality of physical components including a substantially enclosed housing, the signal processing electronics receiving as input a first sound signal recorded from outside the substantially enclosed housing of the computing device and a second sound signal recorded from inside the substantially enclosed housing of the computing device, comprising:
    circuitry for loading a noise profile stored in the computing device, the noise profile indicative of noise characteristics of the computing device as established at the time of manufacturer of the computing device;
    circuitry for generating an estimated noise signal from the noise profile and the second sound signal; and
    circuitry for processing the estimated noise signal and the first sound signal to remove the estimated noise signal thereby generating a third sound signal, wherein the signal to noise ratio associated with the third sound signal is higher than the signal to noise ratio of the computing device associated with the first sound signal.

48. Signal processing electronics according to claim 47, further including at least one analog-to-digital converter to generate first and second digital sound signals from said first and second sound signals, respectively.

49. Signal processing electronics according to claim 48, further including a frequency response filter which receives the first sound signal.

50. Signal processing electronics according to claim 47, further including an encoder/decoder (codec) component.

51. Signal processing electronics according to claim 47, wherein said circuitry for processing the estimated noise signal and the first sound signal is configured to compare the first sound signal and the estimated noise sound signal and amplify the common frequencies.

52. Signal processing electronics according to claim 47, wherein said circuitry for processing the estimated noise signal and the first sound signal is configured to adjust for changes in noise characteristics of a noise signal created by the computing device over time.

53. Signal processing electronics according to claim 47, wherein said circuitry for loading the noise profile stored in the computing device is configured to load the noise profile filter component filters according to a noise globally unique identifier (GUID) assigned to a plurality of components of the computing device.

54. Signal processing electronics according to claim 47, wherein said circuitry for processing the estimated noise signal and the first sound signal is configured to remove at least one of (a) noise from rattle of at least one component in the substantially enclosed housing, (b) fan noise and (c) disk noise.

55. Signal processing electronics according to claim 54, wherein said circuitry for processing the estimated noise signal and the first sound signal is configured to remove reflections of the at least one of (a) noise from rattle of at least one component in the substantially enclosed housing, (b) fan noise and (c) disk noise.

56. Signal processing electronics according to claim 54, wherein said signal processing electronics process sounds signals in the frequency domain.

57. A processor operatively coupled to a computing readable storage medium including computer readable instructions for improving the signal to noise ratio for an audio input signal relative to the noise characteristics of an operating computing device recording the audio input signal, when executed, the computer readable storage medium carry out the following methods:
    recording a first sound signal based on the audio input signal with at least one audio input recording device located outside a substantially enclosed housing of the computing device;
    recording a second sound signal based on the audio input signal with at least one audio input recording device located inside the substantially enclosed housing of the computing device;
    loading a noise profile stored in the computing device, the noise profile indicative of noise characteristics of the computing device as established at the time of manufacturer of the computing device;
    generating an estimated noise signal from the noise profile and the second sound signal; and
    processing the estimated noise signal and the first sound signal to remove the estimated noise signal thereby generating a third sound signal, wherein the signal to noise ratio associated with the third sound signal is higher than the signal to noise ratio of the computing device associated with the first sound signal.

58. The processor operatively coupled to a computer readable storage medium of claim 57, wherein processing the estimated noise signal and the first sound signal further comprise processing the first and second sound signals in the frequency domain.

* * * * *